(12) United States Patent
Chae

(10) Patent No.: US 7,420,640 B2
(45) Date of Patent: Sep. 2, 2008

(54) IN-PLANE SWITCHING MODE LIQUID CRYSTAL DEVICE AND METHOD FOR MANUFACTURING THE SAME

(75) Inventor: Gee Sung Chae, Incheon-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 464 days.

(21) Appl. No.: 11/139,573

(22) Filed: May 31, 2005

(65) Prior Publication Data

US 2005/0270465 A1    Dec. 8, 2005

(30) Foreign Application Priority Data

Jun. 4, 2004    (KR) ...................... 10-2004-0040829

(51) Int. Cl.
  *G02F 1/1343* (2006.01)
  *G02F 1/1335* (2006.01)
(52) U.S. Cl. .................... 349/141; 349/139; 349/114
(58) Field of Classification Search ................ 349/141, 349/139, 114
  See application file for complete search history.

(56) References Cited

U.S. PATENT DOCUMENTS

| 5,852,485 A * | 12/1998 | Shimada et al. ............. 349/141 |
| 5,929,958 A * | 7/1999 | Ohta et al. .................. 349/141 |
| 6,222,602 B1 | 4/2001 | Aratani et al. |
| 6,356,328 B1 * | 3/2002 | Shin et al. .................... 349/141 |
| 6,583,840 B1 | 6/2003 | Inoue et al. |

FOREIGN PATENT DOCUMENTS

| EP | 1357579 A2 | 10/2003 |
| JP | 08286211 A | 11/1996 |
| JP | 09185080 A | 7/1997 |

* cited by examiner

*Primary Examiner*—Mike Qi
(74) *Attorney, Agent, or Firm*—Morgan, Lewis & Bockius LLP

(57) ABSTRACT

An IPS mode LCD device with improved light efficiency by changing a common electrode and a pixel electrode in shape includes first and second substrates facing each other, a plurality of gate and data lines crossing each other on the first substrate for defining a plurality of pixel regions, at least one common electrode formed on the pixel region, wherein the common electrode is formed in shape such that an upper surface area is different than a lower surface area, at least one pixel electrode positioned between each of the common electrode on the pixel region, wherein the pixel electrode is formed in shape such that an upper surface area different larger than a lower surface area, and a liquid crystal layer between the first and second substrates.

20 Claims, 13 Drawing Sheets

IN-PLANE SWITCHING MODE LIQUID CRYSTAL DEVICE AND METHOD FOR MANUFACTURING THE SAME

This application claims the benefit of the Korean Application No. P2004-40829 filed on Jun. 4, 2004; which is hereby incorporated by reference.

BACKGROUND OF THE INVENTION

1. Field of the Invention

The present invention relates to a liquid crystal display (LCD) device, and more particularly, to an In-Plane Switching (IPS) mode LCD device and method for manufacturing the same to improve the light efficiency by changing the shape of an electrode.

2. Discussion of the Related Art

Demands for various display devices have increased as we develop into an informational society. Accordingly, much effort has been made to research and develop various flat display devices such as liquid crystal displays (LCDs), plasma display panels (PDPs), electroluminescent displays (ELDs), and vacuum fluorescent displays (VFDs). Some species of the flat display devices are already being used as displays of various equipments.

Among the various flat display devices, the liquid crystal display (LCD) device has been most widely used as a substitute for the cathode ray tube (CRT) because of thinness, lightness in weight, low power consumption and other advantageous characteristics. In addition to mobile-type LCD devices, such as displays for notebook computers, LCD devices have been developed to be used as computer monitors and, more recently, as televisions to receive and display broadcasting signals.

Despite continued technical developments in LCD technology applied to various fields, research in enhancing the picture quality of LCD devices has been lacking as compared to other physical features and advantages of LCD devices. The key to developing LCD devices to be used as general displays for various applications depends on whether high quality pictures, such as high resolution and high luminance, can be implemented on large-sized screens while still maintaining light weight, thin size, and low power consumption.

Generally, LCD devices include an LCD panel for displaying a picture image and a driving part for applying a driving signal to the LCD panel. The LCD panel includes first and second glass substrates bonded to each other at a predetermined interval, and a liquid crystal layer formed by injecting liquid crystal materials into the space between the first and second glass substrates.

On the first glass substrate (TFT array substrate), there are a plurality of gate lines arranged in a first direction at fixed intervals, a plurality of data lines arranged in a second direction at fixed intervals and perpendicular to the gate lines, a plurality of pixel electrodes in respective pixel regions defined by the gate lines and the data lines arranged in a matrix, and a plurality of thin film transistors (TFTs) switchable in response to signals on the gate lines to transmit signals on the data line to the pixel electrodes. The second glass substrate (color filter array substrate) has a light-shielding layer for shielding light from areas other than from the pixel regions, a color filter layer (R, G, B) for displaying colors, and a common electrode for generating a picture image.

The LCD device is driven according to optical anisotropic and polarizable characteristics of the liquid crystal material. Liquid crystal molecules are aligned using directional characteristics because liquid crystal molecules are long and thin.

In this respect, an induced electric field is applied to the liquid crystal material to control the alignment direction of the liquid crystal molecules. By controlling the alignment direction of the liquid crystal molecules with the induced electric field, light is polarized and manipulated by the optical anisotropic properties of the liquid crystal, thereby generating a picture image. Currently, an active matrix type LCD, in which a TFT and a pixel electrode are connected and aligned in matrix form, is considered to be the best due to its high resolution and its ability to represent animated images.

Hereinafter, related art LCD devices will be described with reference to the accompanying drawings. FIG. 1 is an exploded perspective view of a Twisted Nematic (TN) mode LCD device according to the related art. As shown in FIG. 1, the TN mode LCD device according to the related art includes a lower substrate 1, an upper substrate 2, and a liquid crystal layer 3, wherein the liquid crystal layer 3 is formed between the lower substrate 1 and the upper substrate 2.

Specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and the plurality of data lines 5 are formed perpendicularly to the plurality of gate lines 4 at fixed intervals, thereby defining a plurality of pixel regions P. Plurality of pixel electrodes 6 are respectively formed in pixel regions P defined by the intersection of the plurality of gate and data lines 4 and 5, respectively. Plurality of thin film transistors T are respectively formed at intersecting portions of the plurality of gate and data lines 4 and 5. The upper substrate 2 includes a light-shielding layer 7 that excludes light from regions other than from the pixel regions P, R/G/B color filter layers 8 for displaying various colors, and a common electrode 9 for displaying a picture image.

Thin film transistor T includes a gate electrode, a gate insulating layer (not shown), an active layer, a source electrode, and a drain electrode. The gate electrode projects from gate line 4, and the gate insulating layer (not shown) is formed on an entire surface of the lower substrate 1. Then, the active layer is formed on the gate insulating layer above the gate electrode. The source electrode projects from the data line 5, and the drain electrode is formed on the opposite side of the source electrode. Also, the aforementioned pixel electrode 6 is formed of a transparent conductive metal having high transmittance, for example, ITO (Indium-Tin-Oxide).

In the aforementioned LCD device, liquid crystal molecules of the liquid crystal layer 3 on pixel electrode 6 are aligned by a signal from the thin film transistor T. Light transmittance is controlled according to the alignment of the liquid crystal molecules in the liquid crystal layer 3, thereby displaying a picture image. To align the liquid molecules, an LCD panel drives the liquid crystal molecules by applying an electric field perpendicular to the lower and upper substrates. This method achieves high transmittance and aperture ratio. Damage by static electricity to liquid crystal cells can be prevented since the common electrode 9 of the upper substrate 2 serves as the ground. However, a wide viewing angle is difficult to obtain using this technique.

To overcome this problem, an in-plane switching (IPS) mode LCD device has been recently proposed. Hereinafter, a related art IPS mode LCD device will be described with reference to the accompanying drawings. FIG. 2 is a plane view of a related art IPS mode LCD device. FIG. 3 is a cross sectional view along I-I' of FIG. 2. As shown in FIG. 2 and FIG. 3, the related art IPS mode LCD device mainly includes a lower substrate 10, an upper substrate 20, and a liquid crystal layer 25, wherein the liquid crystal layer 25 is formed between the lower substrate 10 and the upper substrate 20.

The lower substrate 10 includes a gate line 11, a data line 12, a common electrode 13, and a pixel electrode 15. The gate line 11 and the data line 12 cross each other to define a unit pixel region. The common electrode 13 and the pixel electrode 15 are formed at a predetermined interval within the pixel region. Generally, the common electrode 13 is positioned between each pixel electrode 15 with some portions of the common electrode 13 overlapping with the pixel electrode 15 to form a storage capacitor.

Also, a thin film transistor TFT is formed on the lower substrate 10, wherein the thin film transistor TFT includes a gate electrode 11a; a semiconductor layer 26, and source and drain electrodes 12a and 12b; respectively. The gate electrode 11a projects from the gate line 11, and the semiconductor layer 26 is overlaps the gate electrode 11a. Gate insulating layer 14 is formed on the entire surface of the lower substrate 10 including the gate electrode 11a. The source and drain electrodes 12a and 12b are formed at both sides of the semiconductor layer 26, wherein the source electrode 12a is formed at a predetermined interval from the drain electrode 12b. In this state, the drain electrode 12b of the thin film transistor TFT is connected with the pixel electrode 15.

The common electrode 13 is formed at a predetermined interval from the pixel electrode 15, wherein the common electrode 13 is formed on the same layer as either the gate line 11 or the data line 12 when forming either respective line. In the drawings, the common electrode 13 is formed on the same layer as the gate line 11.

Insulating layer 16 is formed between the data line 12 and the pixel electrode 15, wherein the insulating layer 16 is formed of the same material as the gate insulating layer 14. For example, an inorganic insulating material such as $SiN_x$ and $SiO_x$ or an organic insulating material such as acryl, polyimide, BCB (BenzoCycloButene) and photo polymer may be used. Then, a passivation layer 17 and a first alignment layer 18 are sequentially formed on the entire surface of the lower substrate 10 including the insulating layer 16 and the pixel electrode 15.

The common electrode 13 is electrically connected with a common line 19, whereby the common electrode 13 receives a voltage signal. When a voltage signal is applied to the pixel electrode 15 through the drain electrode 12b; the common electrode 13 generates an IPS mode electric field, thereby driving the liquid crystal molecules of the liquid crystal layer 25.

On the upper substrate 20, there is a light-shielding layer 21 to prevent light leakage on the remaining portions of the lower substrate 10 except the pixel region. Upper substrate 20 further includes, a color filter layer 22 for obtaining colors red R, green G and blue B, an overcoat layer 23 for planarizing the color filter layer 22 having color films, and a second alignment layer 24 for defining the initial alignment of liquid crystal molecules. The first and second alignment layers 18 and 24 are rubbed at a pretilt angle of 2° to 5° such that the liquid crystal molecules are initially aligned in parallel to the lower and upper substrates 10 and 20.

The aforementioned drawings show an optical mode of a general IPS mode. In an initial state, light is not transmitted unit a voltage is applied (i.e. normally in a black state). On applying a voltage to the pixel electrode 15 and the common electrode 13, an electric field is generated between the two electrodes 13 and 15 formed on the same substrate. The liquid crystal molecules of the liquid crystal layer 25 are aligned along the electric field formed between the two electrodes 13 and 15. The internal light is then transmitted along the aligned liquid crystal molecules of the liquid crystal layer 25, thereby representing a white state.

During operation, aligning the liquid crystal molecules in a predetermined direction is difficult when applying the voltage to each electrode because the liquid crystal molecules corresponding to the common and pixel electrodes 13 and 15 are positioned in the area where the electric field is divided. Accordingly, in the display mode, disclination is generated at the portion where the electric field is divided. To prevent light leakage on the portions forming the common electrode 13 and the pixel electrode 15, the common electrode 13 and the pixel electrode 15 are formed using metal or an alloy of ITO and metal.

Both the common electrode 13 and the pixel electrode 15 are formed on the lower substrate 10. The liquid crystal layer 25 is formed between the lower and upper substrates 10 and 20 at a predetermined interval therebetween, and the liquid crystal layer 25 is driven by the electric field formed between the common electrode 13 and the pixel electrode 15 on the lower substrate. The liquid crystal layer 25 is formed of liquid crystal molecules having positive dielectric anisotropic characteristics, whereby the longitudinal axes of liquid crystal molecules are aligned along the direction of the electric field.

In the turn-off state, the IPS mode electric field is not applied to the common electrode 13 or the pixel electrode 15, and the alignment direction of liquid crystal molecules in the liquid crystal layer 25 is not changed. In the turn-on state, the IPS mode electric field is applied to the common electrode 13 or the pixel electrode 15, and the alignment direction of liquid crystal molecules in the liquid crystal layer 25 is changed, wherein the liquid crystal molecules are twisted at an angle of 45°.

FIG. 4 is a cross sectional view for explaining an operation of the related art IPS mode LCD device. Referring to FIG. 4, the common electrode 13 and the pixel electrode 15 are alternately positioned in the related art IPS mode LCD device.

In the related art IPS mode LCD device, the different voltages are respectively applied to the common electrode 13 and the pixel electrode 15, whereby the IPS mode electric field is generated between the two electrodes 13 and 15. Due to the liquid crystal molecules having the liquid crystal molecules having positive dielectric anisotropic characteristic, the liquid crystal molecules are aligned in parallel along the IPS mode electric field formed between the two electrodes. As shown in FIG. 4, a complete IPS mode electric field is formed in region A between the common electrode 13 and the pixel electrode 15. This field causes the liquid crystal molecules to become aligned in parallel to the field. However, in region B above the common electrode 13 and the pixel electrode 15, only a partial IPS mode electric field is formed. Consequently, the liquid crystal molecules in Region B do not become completely aligned in parallel.

In the IPS mode LCD device, the common electrode 13 and the pixel electrode 15, positioned in the pixel region, are formed of the light-shielding metal material. The light shielding material blocks about 15% of light emitted from a backlight unit.

As compared with a non-IPS mode LCD device, the IPS mode LCD device has lower light efficiency. In order to overcome this problem, the backlight unit uses more power. However, high power consumption by the backlight unit is disadvantageous for small-sized mobile products, such as mobile phones, notebook computers, PDAs and the like. Accordingly, the related art IPS mode LCD device has the following disadvantages.

First, the common electrode and the pixel electrode have rectangular cross sections. Accordingly, even though a complete IPS mode electric field is formed between the common electrode and the pixel electrode, the rectangular cross sections prevent IPS mode electric field from being formed above the common electrode and the pixel electrode. This non-IPS region formed above the common electrode and the pixel electrode prevents the liquid crystal molecules from becoming completely aligned above the common electrode and the pixel electrode.

Secondly, the common electrode and the pixel electrode of the related art IPS mode LCD device are formed of the light-shielding metal material in the pixel region. This configuration blocks about 15% of the light emitted from the backlight unit. Accordingly, even though the IPS mode LCD device has a wider viewing angle in compared to the non-IPS mode LCD device, the IPS mode LCD device has lower light efficiency. In order to overcome this problem, the backlight unit for the IPS mode LCD device uses more power. High power consumption of the backlight unit is disadvantageous for small-sized mobile products, such as, mobile phones, notebook computers, PDAs and the like. Without the appropriate amount of power provided to these products, proper luminance is difficult to obtain in the mobile products. Accordingly, even though the IPS mode LCD device has a wide viewing angle, its low light efficiency hinders the competitiveness of the IPS mode LCD device over non-IPS mode LCD devices.

SUMMARY OF THE INVENTION

Accordingly, the present invention is directed to an IPS mode LCD device that substantially obviates one or more problems due to limitations and disadvantages of the related art.

An object of the present invention is to provide an IPS mode LCD device and method for manufacturing the same, to improve the light efficiency by changing the shape of a common electrode and a pixel electrode.

Additional advantages, objects, and features of the invention will become apparent to one of ordinary skill in the art as set forth in part in the description which follows and in part upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an exemplary embodiment of an IPS mode LCD device of the present invention includes first and second substrates facing each other, a plurality of gate and data lines crossing each other on the first substrate for defining a plurality of pixel regions, at least one common electrode formed on the pixel region, wherein the common electrode is formed in shape such that an upper surface area is different than a lower surface area, at least one pixel electrode positioned between each of the common electrode on the pixel region, wherein the pixel electrode is formed in shape such that an upper surface area is different than a lower surface area, and a liquid crystal layer between the first and second substrates.

In another aspect, an IPS mode LCD device includes first and second substrates facing each other, a plurality of gate and data lines crossing each other on the first substrate for defining a plurality of pixel regions, at least one common electrode formed on the pixel region, at least one pixel electrode positioned between each of the common electrode, a transparent dielectric layer for covering the common electrode and the pixel electrode, wherein the transparent dielectric layer is formed in shape such that an upper surface area is different than a lower surface area, and a liquid crystal layer between the first and second substrates.

In yet another aspect, a method for manufacturing an IPS mode LCD device includes the steps of forming a gate line on a substrate, forming at least one common electrode in a pixel region on the substrate, the at least one common electrode having a shape such that an upper surface area is different than a lower surface area, forming a data line in perpendicular with the gate line, to define pixel regions, forming a thin film transistor at a crossing portion of the gate and data lines, and forming at least one pixel electrode in parallel with the common electrodes, the at least one pixel electrode having a shape such that an upper surface area is different than a lower surface area.

In yet another aspect, a method for manufacturing an IPS mode LCD device includes the steps of forming a gate line on a substrate, forming at least one common electrode in a pixel region on the substrate, forming a data line in perpendicular with the gate line, to define pixel regions, forming a thin film transistor at a crossing portion of the gate and data lines, forming at least one pixel electrode in parallel with the common electrodes, and forming a transparent dielectric layer for covering the at least one common electrode and the at least one pixel electrode, wherein the transparent dielectric layer is formed in shape such that an upper surface area is different than a lower surface area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Hereinafter, an IPS mode LCD device according to an exemplary embodiment of the present invention will be described with reference to the accompanying drawings.

Figure 1:
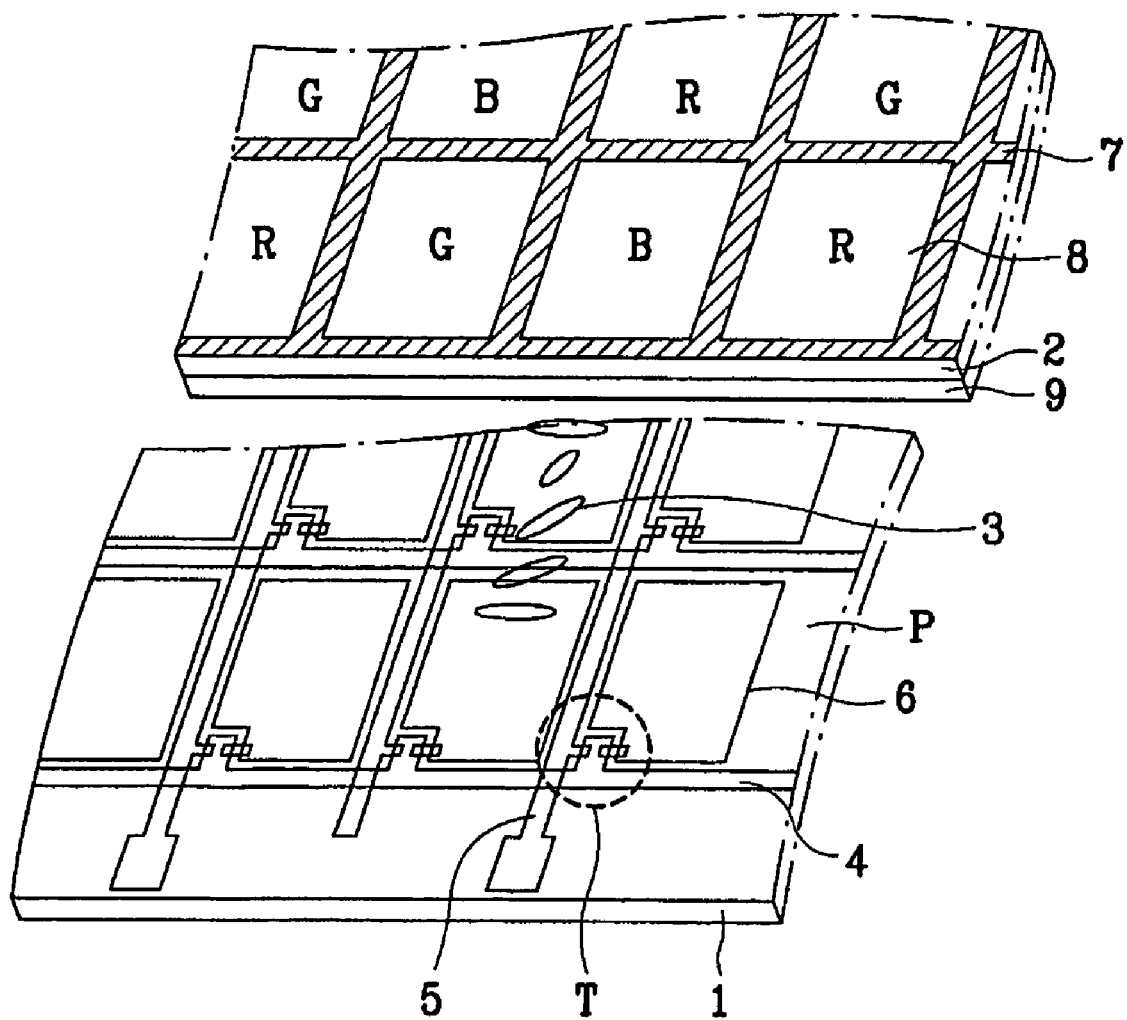
FIG. 1 is an exploded perspective view of a TN mode LCD device according to the related art.
Figure 2:
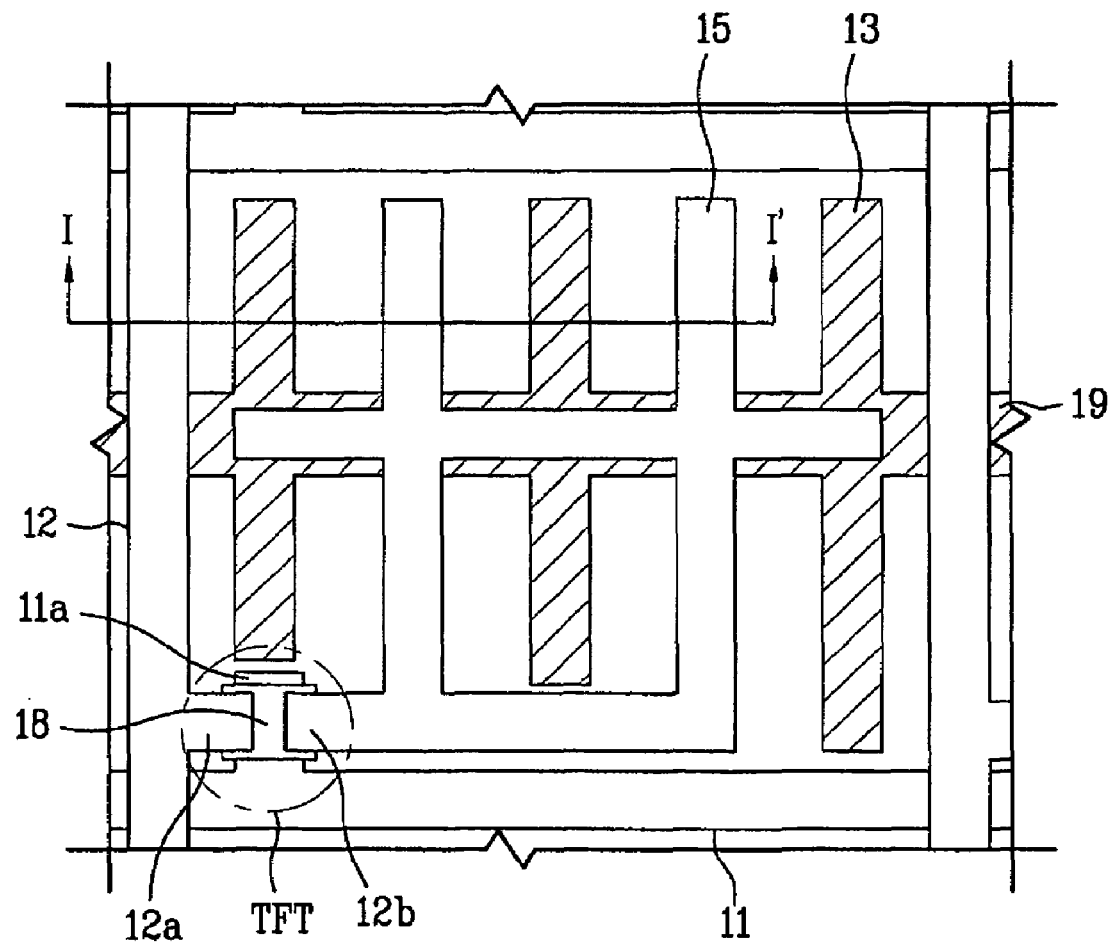
FIG. 2 is a plane view of an IPS mode LCD device according to the related art.
Figure 3:
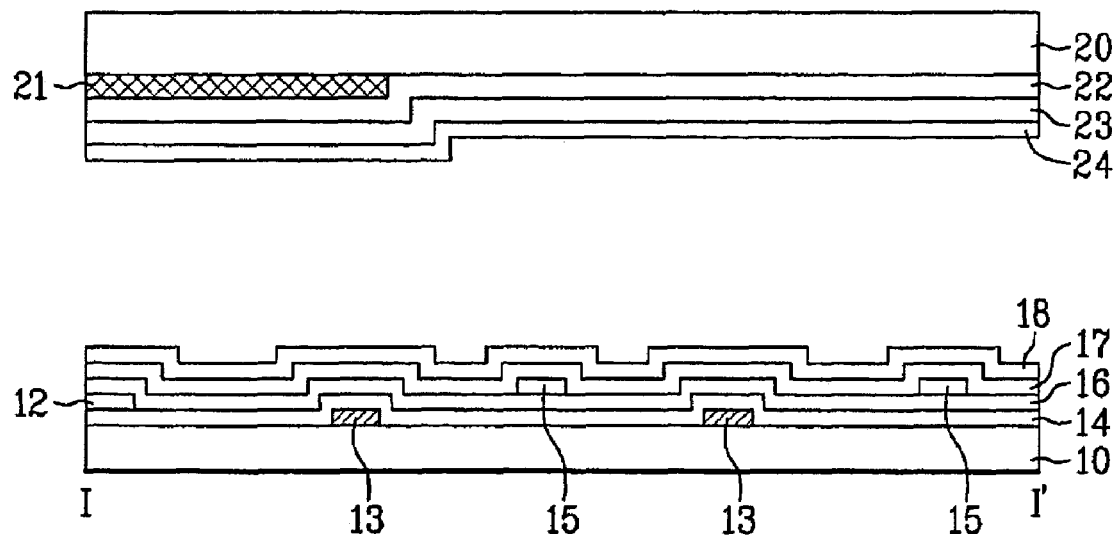
FIG. 3 is a cross sectional view of the IPS mode LCD device along I-I' of FIG. 2.
Figure 4:
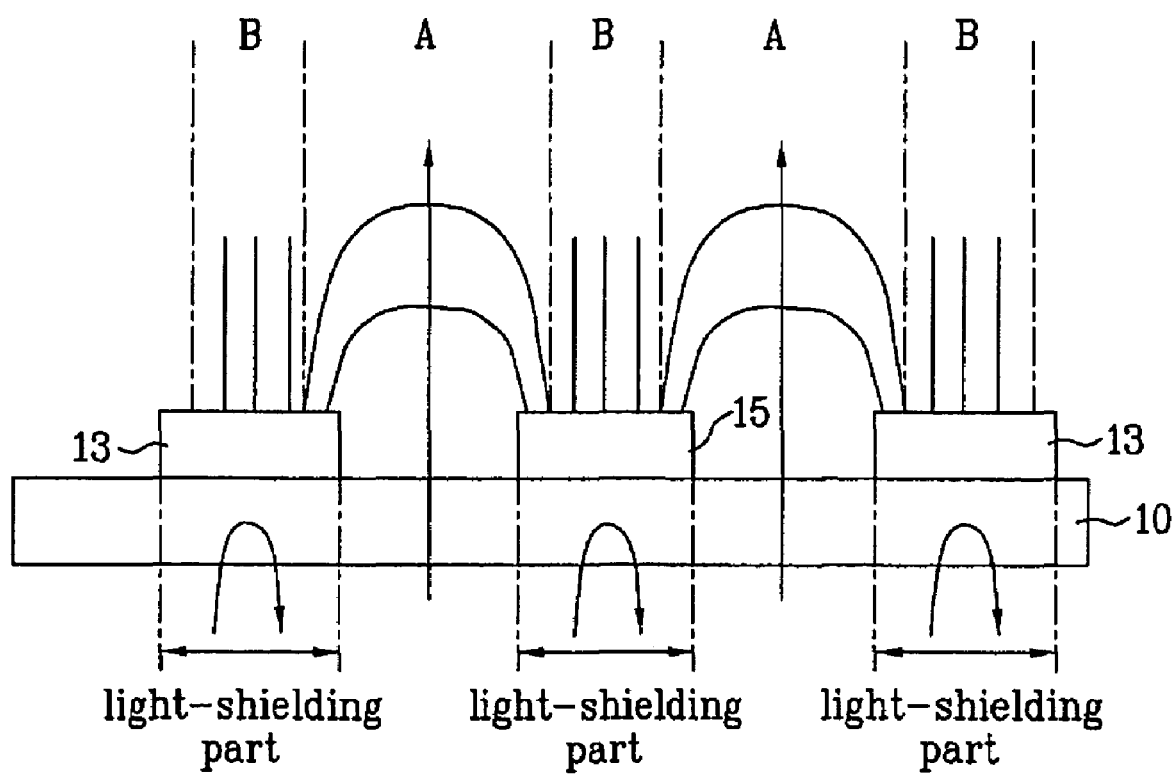
FIG. 4 is a cross sectional view for explaining an operation of an IPS mode LCD device according to the related art.
Figure 5A:
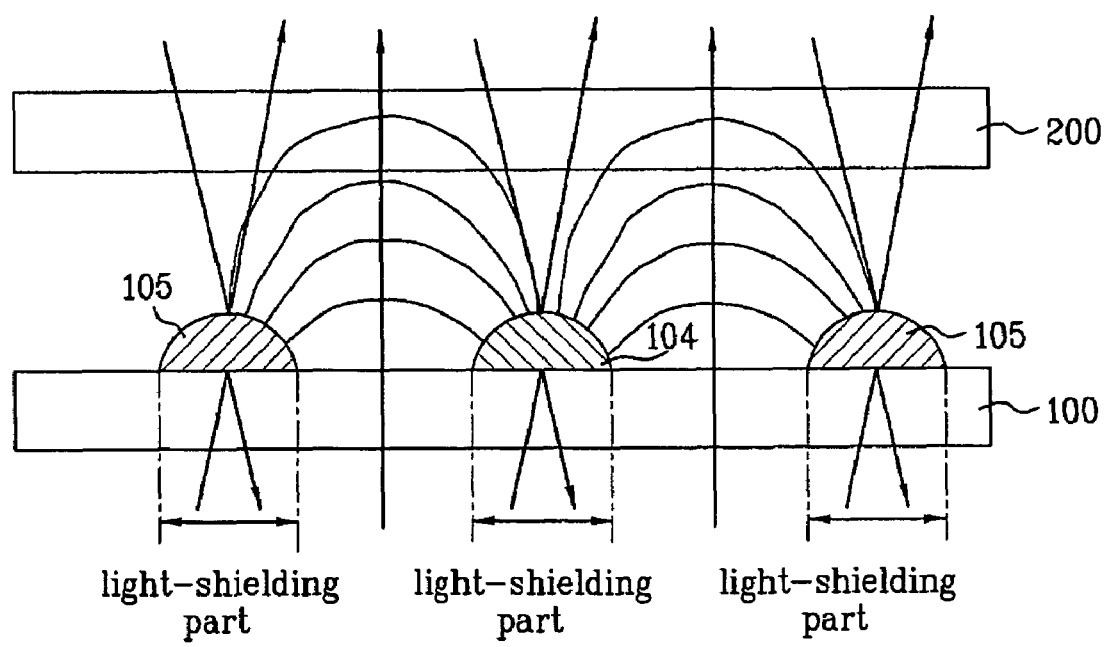
FIGS. 5A-C are cross sectional views of an IPS mode LCD device according to exemplary embodiments of the present invention.

FIG. 5A is a cross sectional view of an IPS mode LCD device according to a first embodiment of the present invention. As shown in FIG. 5A, a pixel electrode 104 and a common electrode 105 are alternately formed on a lower substrate 100 of the IPS mode LCD device. In particular, the pixel electrode 104 and the common electrode 105 are shaped such that an upper surface area is different than a lower surface area. Accordingly, when a voltage is applied to the pixel electrode 104 and the common electrode 105, an IPS mode electric field is formed uniformly around the electrodes except at the top points of the two electrodes 104 and 105. This allows the liquid crystal molecules to be aligned smoothly regardless of the division of regions.

Figure 5B:
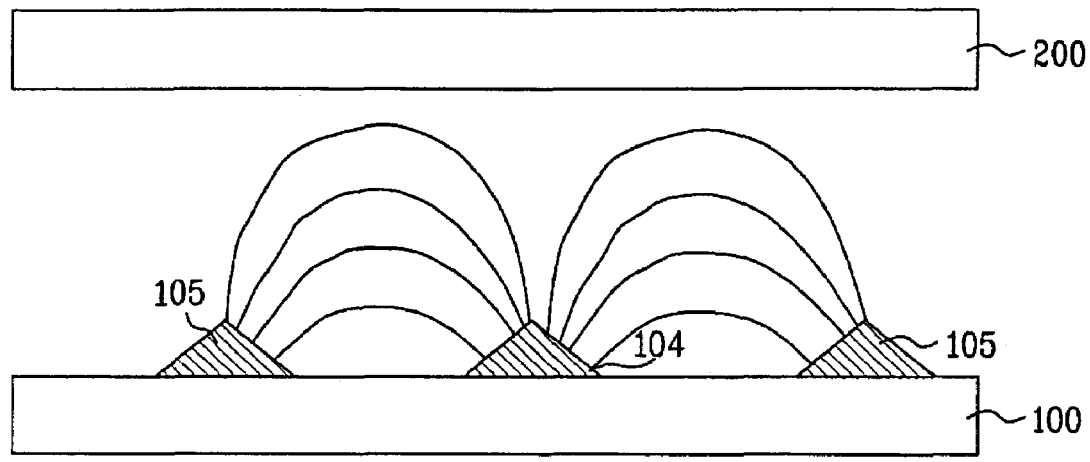
Figure 5C:
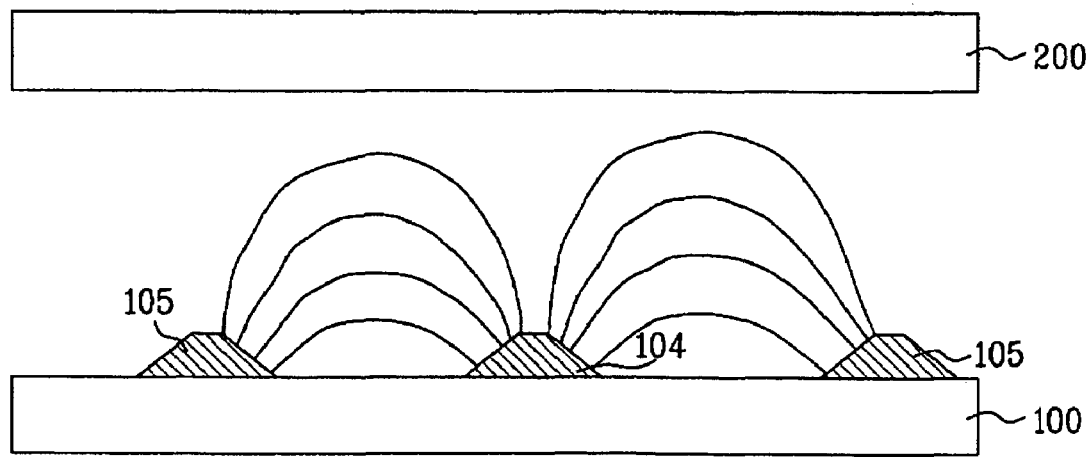

In this embodiment, the cross sectional view of FIG. 5A shows the pixel electrode 104 and the common electrode 105 are formed in shape of a semicircle. However, the pixel electrode 104 and the common electrode 105 may be formed in shape of a triangle or a trapezoid as shown in FIG. 5B and FIG. 5C, respectively.

Also, the pixel electrode 104 and the common electrode 105 are formed of a metal material having high reflectivity, such as, aluminum (Al) or silver (Ag). Accordingly, when the external light is incident on the pixel electrode 104 and the common electrode 105, the light is reflected from the top points of the pixel electrode 104 and the common electrode 105. In other words, the external light is used as a partial light source in conjunction with the light emitted from a backlight unit (not shown) to improve the light efficiency. In this case, like the related art, the light emitted from the backlight unit incident with the flat surface of the pixel electrode 104 and the common electrode 105 are shielded. However, the external light incident with the top points of the pixel electrode 104 and the common electrode 105 are reflected back. This allows the reflected light to be used as a light source, thereby improving the light efficiency.

Figure 6A:
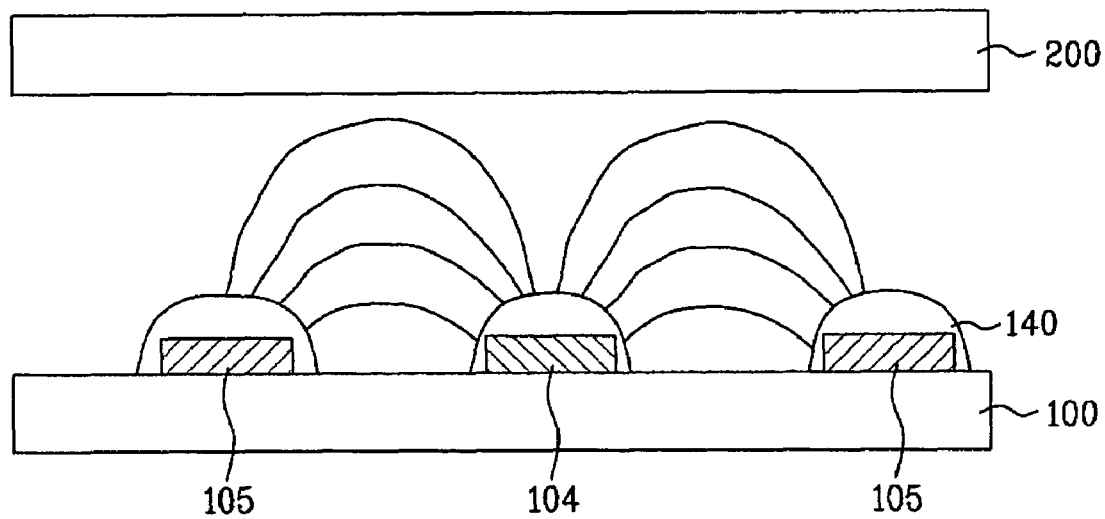
FIGS. 6A-C are cross sectional views of an IPS mode LCD device according to exemplary embodiments of the present invention.

FIG. 6A is a cross sectional view of an IPS mode LCD device according to a second embodiment of the present invention. As shown in FIG. 6A, a pixel electrode 104 and a common electrode 105 are alternately formed on a lower substrate 100 of the IPS mode LCD device according to the second embodiment of the present invention. In addition, a transparent dielectric layer 140 covers an upper surface of the pixel electrode 104 and the common electrode 105. The transparent dielectric layer 140 is shaped such that an upper surface area is different than a lower surface area.

Like the related art LCD device, the pixel electrode 104 and the common electrode 105 in the IPS mode LCD device according to the second embodiment of the present invention have an upper surface area having the same size as a lower surface area. The cross sectional shape is that of a rectangle. However, a transparent dielectric layer 140 is formed to cover the upper surfaces of each of the pixel electrode 104 and the common electrode 105. The transparent dielectric layer 140 is formed of a material having a dielectric constant that is the same as, or similar to that of the liquid crystal material. The transparent dielectric layer 140 may be formed of an inorganic material layer or an organic material layer.

The transparent dielectric layer 140 is positioned on each of the pixel electrode 104 and the common electrode 105, to compensate for the path of light reflected from the pixel electrode 104 and the common electrode 105, in order to form a parallel electric field on the upper surfaces of the pixel electrode 104 and the common electrode 105. Accordingly, when a voltage is applied to the pixel electrode 104 and the common electrode 105, an IPS mode electric field is formed uniformly around the electrodes except at the top points of the two electrodes 104 and 105. This allows the liquid crystal molecules to be aligned smoothly regardless of the division of regions.

Figure 6B:
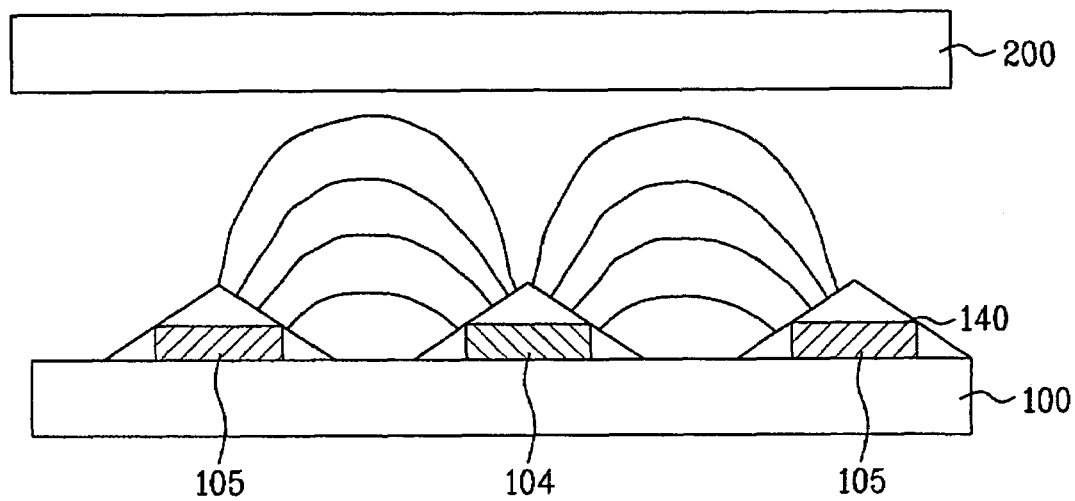
Figure 6C:
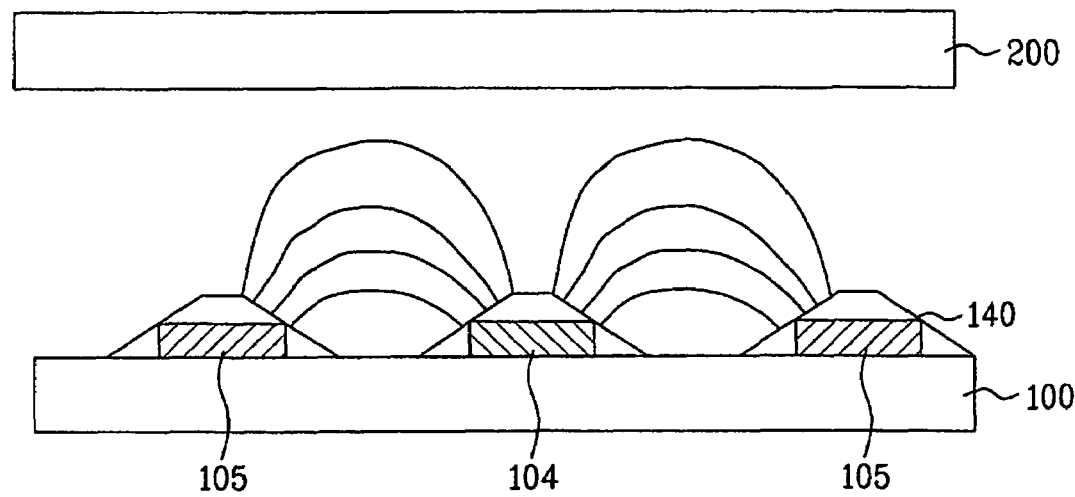

In the embodiment, the cross sectional view of FIG. 6A shows the transparent dielectric layer 140 is formed in shape of a semicircle. However, the transparent dielectric layer 140 may be formed in shape of a triangle or a trapezoid as shown in FIG. 6B and FIG. 6C, respectively.

Figure 10A:
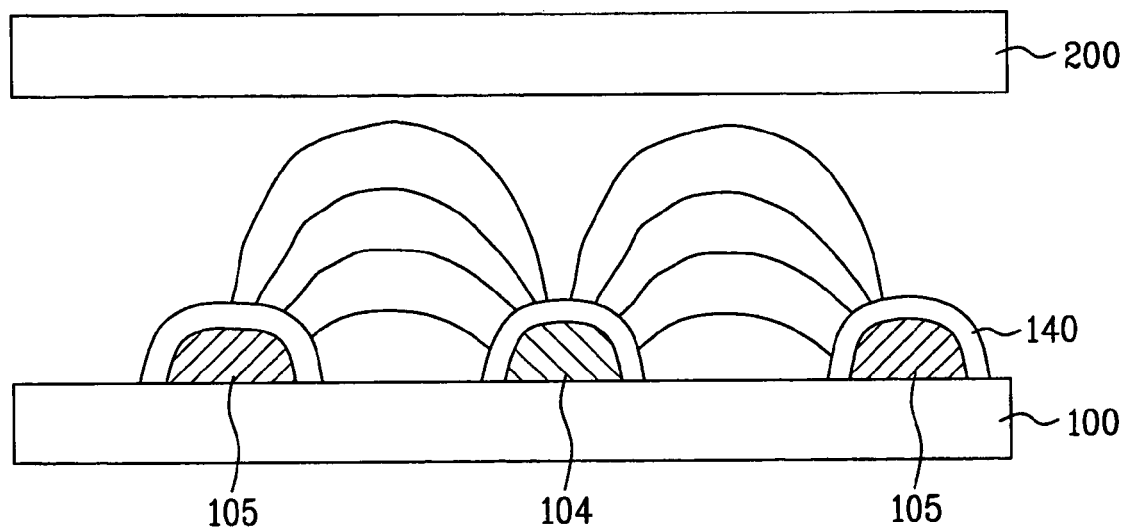
FIGS. 10A-C are cross sectional views of an IPS mode LCD device according to exemplary embodiments of the present invention.
Figure 10B:
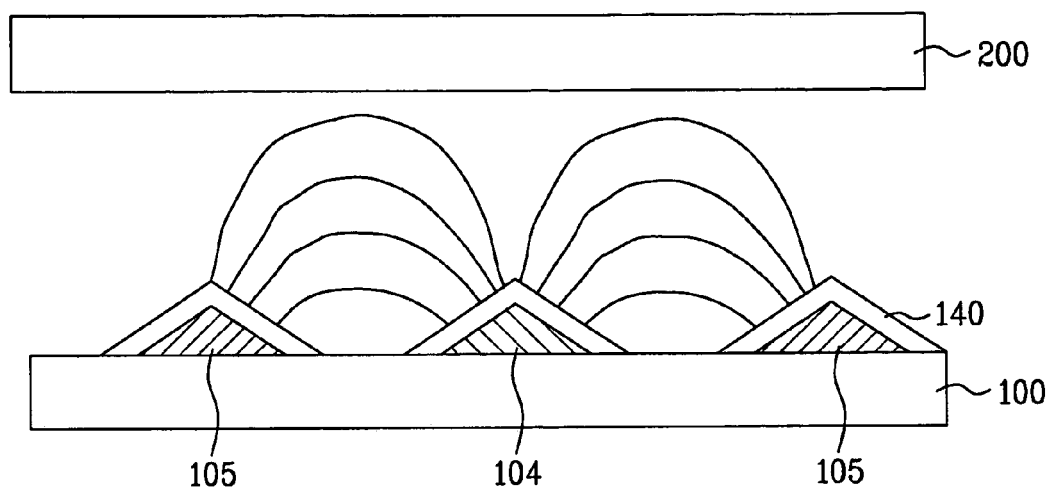
Figure 10C:
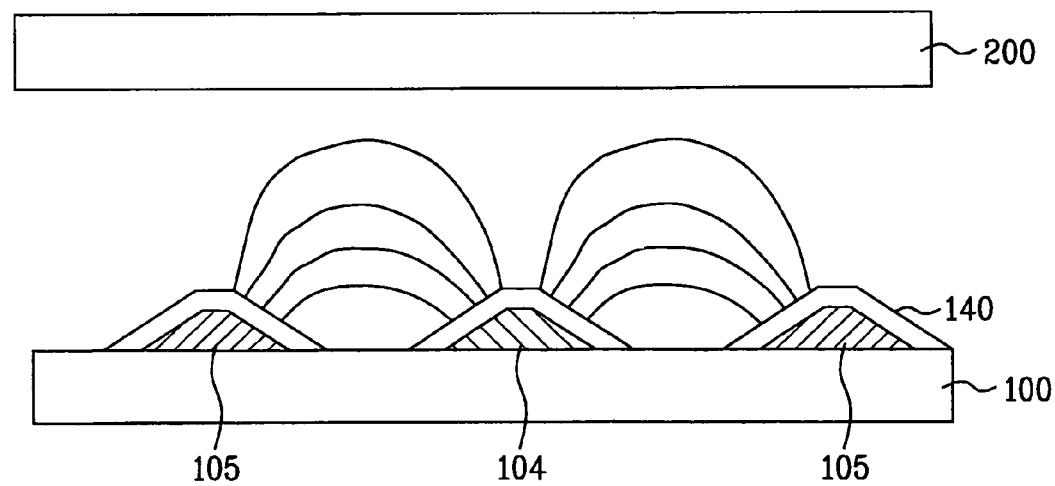

In an alternative exemplary embodiment, the transparent dielectric layer 140 may have the same shape as that of the pixel electrode 104 and the common electrode 105. For example, the cross sectional view of FIG. 10A shows the transparent dielectric layer 140, the pixel electrode 104, and the common electrode 105 are formed in shape of a semicircle. However, the transparent dielectric layer 140, the pixel electrode 104, and the common electrode 105 may be formed in shape of a triangle or a trapezoid as shown in FIG. 10B and FIG. 10C, respectively.

Figure 7:
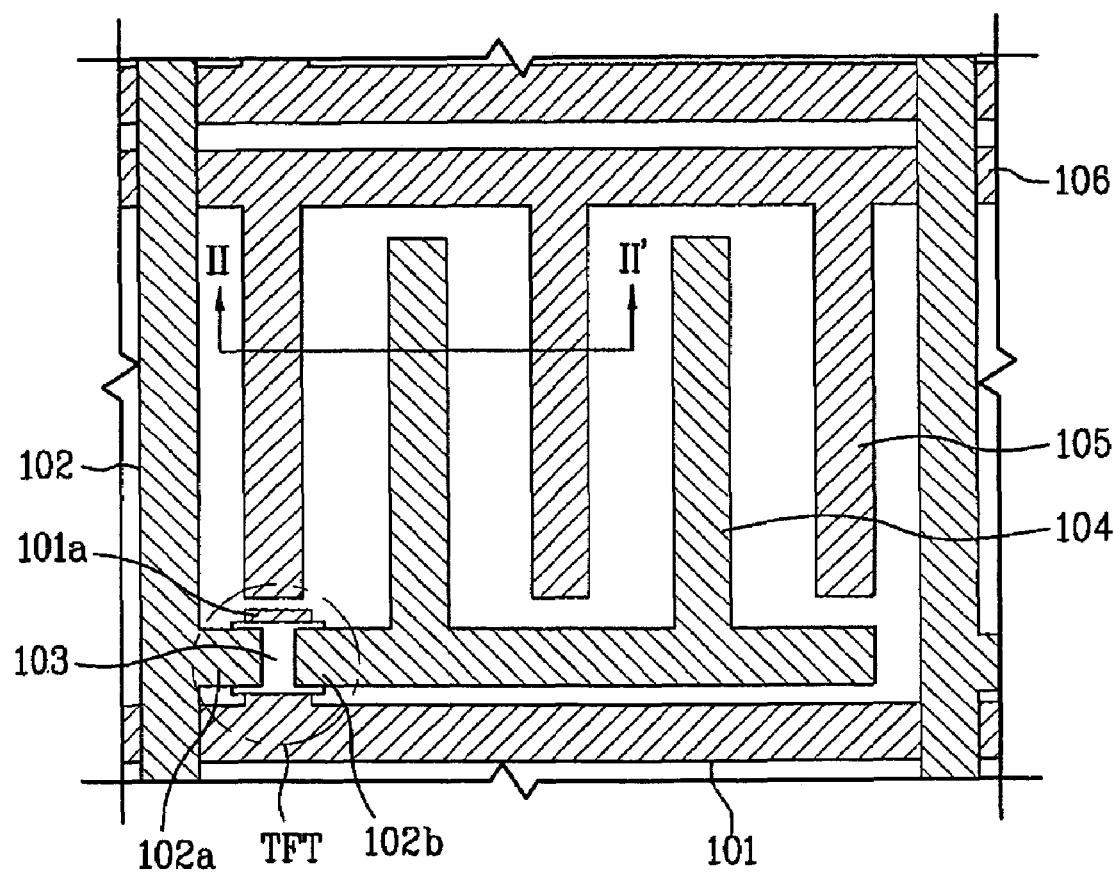
FIG. 7 is a plane view of an IPS mode LCD device according to the present invention.
Figure 8:
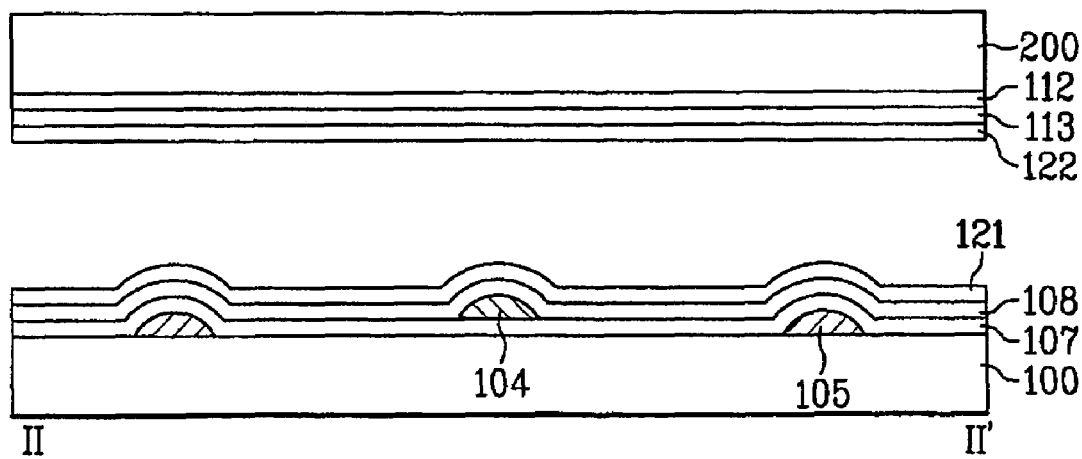
FIG. 8 is a cross sectional view of an IPS mode LCD device along II-II' of FIG. 7, according to the first embodiment of the present invention.

Hereinafter, a method for manufacturing an IPS mode LCD device according to the preferred exemplary embodiments of the present invention will be described with reference to the accompanying drawings. FIG. 7 is a plane view of an IPS mode LCD device according to the preferred embodiments of the present invention. FIG. 8 is a cross sectional view of an IPS mode LCD device along II-II' of FIG. 7, according to the first embodiment of the present invention.

As shown in FIG. 7 and FIG. 8, the IPS mode LCD device according to the first embodiment of the present invention includes a lower substrate 100. A gate line 101 and a data line 102 are formed on the lower substrate 100, wherein the gate line 101 and the data line 102 cross each other to define a unit pixel region. Then, a pixel electrode 104 and a common electrode 105 are formed at a predetermined interval from each other within the pixel region. As mentioned above, the pixel electrode 104 and the common electrode 105 are shaped such that an upper surface area is different than a lower surface area.

After that, a thin film transistor TFT is formed on the lower substrate 100. The thin film transistor TFT is comprised of a gate electrode 101a; a semiconductor layer 103, and source and drain electrodes 102a and 102b. At this time, the gate electrode 101a projects from the gate line 101, and the semiconductor layer 103 is overlaps the gate electrode 101a with a gate insulating layer 107 formed on an entire surface of the lower substrate 100 including the gate electrode 101a. Also, the source and drain electrodes 102a and 102b are formed on both sides of the semiconductor layer 103, wherein the source and drain electrodes 102a and 102b are formed at a predetermined interval therebetween. Also, the drain electrode 102b of the thin film transistor TFT is connected with the pixel electrode 104.

The pixel electrode 104 is formed at the same layer as the data line 102, and the common electrode 105 and a common line 106 are formed at the same layer as the gate line 101. The gate line 101 and the data line 102 may be formed of a radioactive metal or a metal coated with a radioactive material. The common electrode 105 is positioned between each of the pixel electrode 104, wherein the common electrode 105 is electrically connected with the common line 106 for receiving a common voltage. The common electrode 105 is formed at the same layer as the common line 106, thereby improving the integration of components.

Then, the gate insulating layer 107 is formed on the gate line 101 having the gate electrode 101a; the common line 106, and the common electrode 105, wherein the gate insulating layer 107 is insulated from the gate line 101 having the gate electrode 101a; the common line 106 and the common electrode 105. The gate insulating layer 107 may be formed of an inorganic insulating layer such as $SiN_x$ and $SiO_x$, or an organic insulating layer, such as acryl, polyimide, BCB (BenzoCycloButene) and photo polymer.

After that, a passivation layer 108 is formed on the gate insulating layer 107 including the pixel electrode 104. The passivation layer 108 is formed with the same material as the gate insulating layer 107 (i.e., the inorganic insulating layer such as $SiN_x$ and $SiO_x$ or the organic insulating layer such as acryl, polyimide, BCB (BenzoCycloButene) and photo polymer). Then, a first alignment layer 121 is formed on an entire surface of the passivation layer 108 for initially aligning the liquid crystal molecules, and a rubbing process is performed on the first alignment layer 121.

Next, an upper substrate 200 is formed opposite to the lower substrate 100. The upper substrate 200 includes a light-shielding layer (not shown), a color filter layer 112, an overcoat layer 113, and a second alignment layer 122. The light-shielding layer (not shown) prevents the light leakage on the remaining portions (in correspondence with the gate line, the data line and the thin film transistor) of the lower substrate excluding the pixel region. The color filter layer 112 represents colors of red R, green G and blue B. The overcoat layer 113 is formed on an entire surface of the upper substrate 200, and the second alignment layer 122 is formed on an entire surface of the overcoat layer 113. At this time, the second alignment layer 122 is rubbed to define the initial alignment of liquid crystal molecules.

In the IPS mode LCD device according to the first embodiment of the present invention, the liquid crystal layer of the liquid crystal molecules is formed between the lower substrate 100 and the upper substrate 200. The liquid crystal molecules have positive dielectric anisotropic characteristics. When a voltage is applied to the common electrode 105 and the pixel electrode 104, an IPS mode electric field is generated between the common electrode 105 and the pixel electrode 104. Since the common electrode 105 and the pixel electrode 104 are formed in shape of a hemisphere, for example, the reflectivity of external light higher as compared to the common electrode 105 and the pixel electrode 104 having a cross sectional shape of a rectangle. Moreover, a parallel electric field is formed on the upper surfaces of the common electrode 105 and the pixel electrode 104, whereby the liquid crystal molecules of the liquid crystal layer are smoothly aligned regardless of the division of regions.

Figure 9:
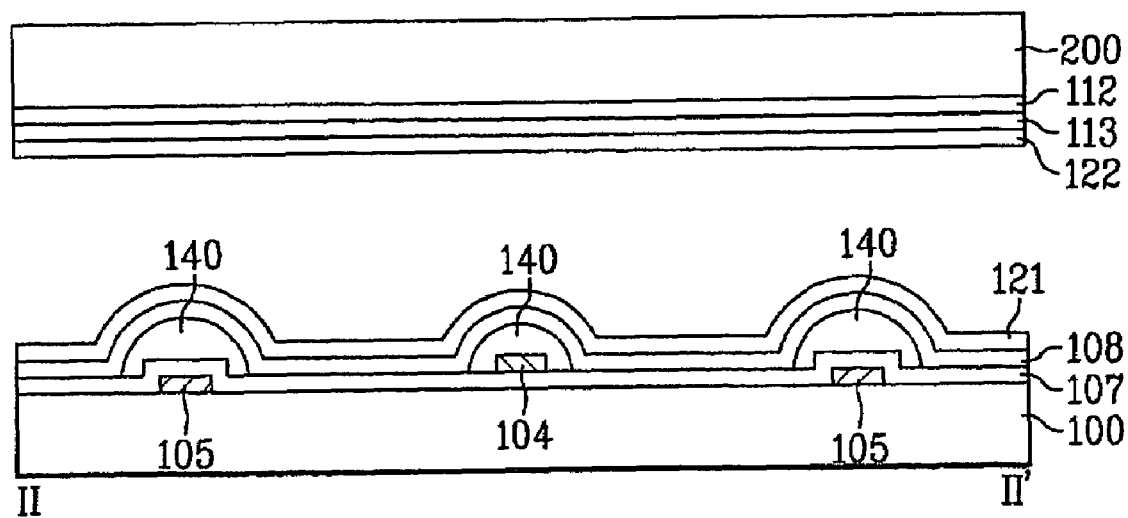
FIG. 9 is a cross sectional view of an IPS mode LCD device along II-II' of FIG. 7, according to the second embodiment of the present invention.

FIG. 9 is a cross sectional view of an IPS mode LCD device along II-II' of FIG. 7, according to the second exemplary embodiment of the present invention.

As shown in FIG. 7 and FIG. 9, the IPS mode LCD device according to the second embodiment of the present invention includes a lower substrate 100. A gate line 101 and a data line 102 are formed on the lower substrate 100, wherein the gate line 101 and the data line 102 cross each other to define a unit pixel region. Then, a pixel electrode 104 and a common electrode 105 are formed at a predetermined interval from each other within the pixel region. A transparent dielectric layer 140 is additionally formed on each of the pixel electrode 104 and the common electrode 105. The transparent dielectric layer 140 is formed in shape such that an upper surface area is different than a lower surface area.

After that, a thin film transistor TFT is formed on the lower substrate 100. The thin film transistor TFT is comprised of a gate electrode 101a; a semiconductor layer 103, and source and drain electrodes 102a and 102b. At this time, the gate electrode 101a projects from the gate line 101, and the semiconductor layer 103 is overlaps the gate electrode 101a with a gate insulating layer 107 formed on an entire surface of the lower substrate 100 including the gate electrode 101a. Also, the source and drain electrodes 102a and 102b are formed on both sides of the semiconductor layer 103, wherein the source and drain electrodes 102a and 102b are formed at a predetermined interval therebetween. The drain electrode 102b of the thin film transistor TFT is connected with the pixel electrode 104.

The pixel electrode 104 is formed at the same layer as the data line 102, and the common electrode 105 and a common line 106 are formed at the same layer as the gate line 101. The gate line 101 and the data line 102 may be formed of a radioactive metal or a metal coated with radioactive material. The transparent dielectric layer 140 may be formed of an organic layer or an inorganic layer, wherein the transparent dielectric layer 140 is formed of a material having a dielectric constant that is the same as, or similar to that of the liquid crystal material. The common electrode 105 is formed at a predetermined interval from the pixel electrode 104, and the common electrode 105 is electrically connected with the common line 106 for receiving a common voltage. In this case, the common electrode 105 and the common line 106 are formed at the same layer, thereby improving the integration of components.

After that, the gate insulating layer 107 is formed on the gate line 101 having the gate electrode 101a; the common line 106, and the common electrode 105, wherein the gate insulating layer 107 is insulated from the gate line 101 having the gate electrode 101a; the common line 106 and the common electrode 105. The gate insulating layer 107 may be formed of an inorganic insulating layer such as $SiN_x$ and $SiO_x$ or an organic insulating layer such as acryl, polyimide, BCB (BenzoCycloButene) and photo polymer.

Then, the transparent dielectric layer 140 is formed on the gate insulating layer 107 covering the common electrode 105 and the pixel electrode 104. In this case, since the transparent dielectric layer 140 is formed of a material having the dielectric constant that is the same as, or similar to the liquid crystal material, the electric field is induced on the surface of the transparent dielectric layer 140, as shown in FIG. 6A, when forming the parallel electric field between the common electrode 105 and the pixel electrode 104.

A passivation layer 108 is formed on the gate insulating layer 107 including the transparent dielectric layer 140. The passivation layer 108 is formed with the same material as the gate insulating layer 107 (i.e., the inorganic insulating layer such as $SiN_x$ and $SiO_x$, or the organic insulating layer such as acryl, polyimide, BCB (BenzoCycloButene) and photo polymer). Then, a first alignment layer 121 is formed on an entire surface of the passivation layer 108 for initially aligning the liquid crystal molecules, and a rubbing process is performed on the first alignment layer 121.

Next, an upper substrate 200 is formed opposite to the lower substrate 100. The upper substrate 200 includes a light-shielding layer (not shown), a color filter layer 112, an overcoat layer 113 and a second alignment layer 122. The light-shielding layer (not shown) prevents the light leakage on the remaining portions (in correspondence with the gate line, the data line and the thin film transistor) of the lower substrate excluding the pixel region. The color filter layer 112 represents colors of red R, green G and blue B. The overcoat layer 113 is formed on an entire surface of the upper substrate 200, and the second alignment layer 122 is formed on an entire surface of the overcoat layer 113. At this time, the second alignment layer 122 is rubbed to define the initial alignment of liquid crystal molecules.

In the IPS mode LCD device according to the second embodiment of the present invention, the liquid crystal layer of the liquid crystal molecules is formed between the lower substrate 100 and the upper substrate 200. The liquid crystal molecules have positive dielectric anisotropic characteristics. When a voltage is applied to the common electrode 105 and the pixel electrode 104, the liquid crystal molecules are aligned along the IPS mode electric field on the transparent dielectric layer 140 for the surface of the common electrode 105 and the pixel electrode 104.

In the IPS mode LCD device according to the exemplary embodiments of the present invention, the electrode may be shaped such that the upper surface area is different than the lower surface area. Alternatively, a transparent dielectric layer, having a dielectric constant that is the same as, or similar to the liquid crystal material, may be formed on each of the electrodes and shaped such that the upper surface area is different than the lower surface area. In one exemplary embodiment, the transparent dielectric layer may have a cross-sectional shape of a semicircle, a triangle, or a trapezoid as shown in FIGS. 6A-6C. In another exemplary embodiment, the transparent dielectric layer may have the same shape as that of the common electrode and/or the pixel electrode, such as a cross-sectional shape of a semicircle, a triangle, or a trapezoid as shown in FIGS. 10A-10C. Accordingly, it is possible to generate a parallel electric field, so that the same level of luminance as that of the related art can be maintained with a lower voltage applied to the common electrode and the pixel electrode. Therefore, the IPS mode LCD device according to the exemplary embodiments of the present invention decreases the power consumption without affecting performance. Also, it is possible to improve the reflectivity of external light, whereby the IPS mode LCD device can be used as a trans-reflective type LCD device.

As mentioned above, the IPS mode LCD device according to the exemplary embodiment of the present invention has the following advantages. First, in the IPS mode LCD device according to the present invention, the electrode may be shaped such that the upper surface area is different than the lower surface area. Alternatively, the transparent dielectric layer, having the dielectric constant that is the same as, or similar to the liquid crystal material, may be formed on each of the electrodes and shaped such that the upper surface area is different than the lower surface area. Still alternatively, the transparent dielectric layer may be formed on each of the electrodes such that the transparent dielectric layer has the same shape as the electrodes. Accordingly, it is possible to generate parallel electric field between the common electrode and the pixel electrode, so that the liquid crystal molecules positioned above the common electrode and the pixel electrode are normally aligned along the parallel electric field, thereby increasing the portions driven by the parallel electric field. Thus, it is possible to decrease the power consumption by improving the light efficiency.

Also, the IPS mode LCD device according to the exemplary embodiments of the present invention improves the reflectivity of external light, so that the external light can be used as a light source in conjunction with the light emitted from the backlight unit. That is, the IPS mode LCD device according to the present invention may be used as a trans-reflective type LCD device.

Furthermore, as the power consumption decreases, the IPS mode LCD device according to the exemplary embodiments of the present invention may be used in mobile products thereby producing mobile products having a wide viewing angle.

In addition, the IPS mode LCD device according the exemplary embodiments of the present invention can improve light efficiency by changing the shape of the electrodes without additional fabrication processes.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An IPS (In-Plane Switching) mode LCD device comprising:
   first and second substrates facing each other;
   a plurality of gate and data lines crossing each other on the first substrate for defining a plurality of pixel regions;
   at least one common electrode formed on the pixel region;
   at least one pixel electrode positioned adjacent to each of the common electrode;
   a transparent dielectric layer covering the common electrode and the pixel electrode, wherein the transparent dielectric layer has a cross sectional shape of a semicircle, a triangle, or a trapezoid; and
   a liquid crystal layer between the first and second substrates,
   wherein the common electrode and the pixel electrode are formed of a metal material having reflectivity, respectively.

2. The IPS mode LCD device of claim 1, further comprising first and second alignment layers respectively formed on the first and second substrates respectively.

3. The IPS mode LCD device of claim 1, wherein the liquid crystal layer is comprised of liquid crystal molecules having positive dielectric anisotropic characteristics.

4. The IPS mode LCD device of claim 1, wherein the at least one common electrode and the at least one pixel electrode are respectively formed at the same layer as the gate line and the data line.

5. The IPS mode LCD device of claim 1, wherein the transparent dielectric layer is formed of an inorganic layer or an organic layer, having a dielectric constant similar to that of the liquid crystal layer.

6. The IPS mode LCD device of claim 1, wherein the at least one common electrode and the transparent dielectric layer have a cross sectional shape of semicircle.

7. The IPS mode LCD device of claim 1, wherein the at least one pixel electrode and the transparent dielectric layer have a cross sectional shape of semicircle.

8. The IPS mode LCD device of claim 1, wherein the at least one common electrode and the transparent dielectric layer have a cross sectional shape of triangle.

9. The IPS mode LCD device of claim 1, wherein the at least one pixel electrode and the transparent dielectric layer have a cross sectional shape of triangle.

10. The IPS mode LCD device of claim 1, wherein the at least one common electrode and the transparent dielectric layer have a cross sectional shape of trapezoid.

11. The IPS mode LCD device of claim 1, wherein the at least one pixel electrode and the transparent dielectric layer have a cross sectional shape of trapezoid.

12. A method for manufacturing an IPS (In-Plane Switching) mode LCD device comprising:
- forming a gate line on a substrate;
- forming at least one common electrode in a pixel region on the substrate with a metal material having reflectivity;
- forming a data line in perpendicular with the gate line, to define pixel regions;
- forming a thin film transistor at a crossing portion of the gate and data lines; and
- forming at least one pixel electrode in parallel with the common electrodes with a metal material having reflectivity; and
- forming a transparent dielectric layer for covering the at least one common electrode and the at least one pixel electrode, wherein the transparent dielectric layer has a cross sectional shape of a semicircle, a triangle, or a trapezoid.

13. The method of claim 12, wherein the at least one common electrode and the at least one pixel electrode are formed at the same layer as the gate line and the data line respectively.

14. The method of claim 12, wherein the transparent dielectric layer is formed of either an inorganic, layer or an organic layer, having a dielectric constant similar to that of the liquid crystal layer.

15. The method of claim 12, wherein the at least one common electrode and the transparent dielectric layer have a cross sectional shape of semicircle.

16. The method of claim 12, wherein the at least one pixel electrode and the transparent dielectric layer have a cross sectional shape of semicircle.

17. The method of claim 12, wherein the at least one common electrode and the transparent dielectric layer have a cross sectional shape of triangle.

18. The method of claim 12, wherein the at least one pixel electrode and the transparent dielectric layer have a cross sectional shape of triangle.

19. The method of claim 12, wherein the at least one common electrode and the transparent dielectric layer have a cross sectional shape of trapezoid.

20. The method of claim 12, wherein the at least one pixel electrode and the transparent dielectric layer have a cross sectional shape of trapezoid.

* * * * *